(12) United States Patent
Henry et al.

(10) Patent No.: US 8,588,539 B2
(45) Date of Patent: Nov. 19, 2013

(54) METHODS AND DEVICES FOR FILTERING AND CODING A DIGITAL SIGNAL

(75) Inventors: Félix Henry, Rennes (FR); Isabelle Corouge, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1309 days.

(21) Appl. No.: 12/389,587

(22) Filed: Feb. 20, 2009

(65) Prior Publication Data

US 2009/0210469 A1    Aug. 20, 2009

(30) Foreign Application Priority Data

Feb. 20, 2008  (FR) ..................................... 08 51088
Feb. 20, 2008  (FR) ..................................... 08 51089

(51) Int. Cl.
| | | |
|---|---|---|
| G06K 9/36 | (2006.01) | |
| G06K 9/40 | (2006.01) | |
| G06K 9/46 | (2006.01) | |

(52) U.S. Cl.
USPC .......................................... 382/239; 382/261

(58) Field of Classification Search
USPC .......................................... 382/232, 239, 261
See application file for complete search history.

(56) References Cited

U.S. PATENT DOCUMENTS

| | | | |
|---|---|---|---|
| 5,978,517 A | 11/1999 | Henry et al. .................. 382/253 |
| 5,995,027 A | 11/1999 | Henry ............................. 341/50 |
| 6,215,422 B1 | 4/2001 | Henry et al. .................... 341/51 |
| 6,333,705 B1 | 12/2001 | Amonou et al. ............... 341/107 |
| 6,498,866 B2 | 12/2002 | Charrier et al. ............... 382/248 |
| 6,501,860 B1 | 12/2002 | Charrier et al. ............... 382/240 |
| 6,631,213 B1 | 10/2003 | Amonou et al. .............. 382/232 |
| 6,778,608 B1 | 8/2004 | Berthelot et al. ......... 375/240.18 |
| 6,801,666 B1 | 10/2004 | Henry et al. .................. 382/240 |
| 7,016,549 B1 * | 3/2006 | Utagawa ....................... 382/261 |
| 7,027,656 B2 | 4/2006 | Henry et al. .................. 382/239 |
| 7,088,858 B2 | 8/2006 | Henry ........................... 382/173 |
| 7,315,648 B2 | 1/2008 | Henry ........................... 382/173 |

(Continued)

FOREIGN PATENT DOCUMENTS

| | | |
|---|---|---|
| EP | 1 146 748 A2 | 10/2001 |
| FR | 2 889 382 | 2/2007 |

(Continued)

OTHER PUBLICATIONS

Gupta, N. ("Despeckling of medical ultrasound images using data and rate adaptive lossy compression," IEEE transaction on Medical Imaging, vol. 24, Issue 6, Jun. 2005, pp. 743-754).*

(Continued)

*Primary Examiner* — Yubin Hung
(74) *Attorney, Agent, or Firm* — Fitzpatrick, Cella, Harper & Scinto

(57) ABSTRACT

To filter a digital signal, in which, for each sample of the signal, a plurality of context functions take account of a predetermined number of other samples of the signal: the value of a context function from the plurality of context functions for each sample to be filtered is calculated; the signal is divided into a set of sub-signals corresponding respectively to the different values of the context functions; and, for each sub-signal: an optimal filter is determined according to a first criterion that depends on the values of the sub-signal; and the optimal filter is associated with the context function corresponding to the sub-signal.
Application to the coding of a digital signal representing an image.

12 Claims, 9 Drawing Sheets

(56) References Cited

U.S. PATENT DOCUMENTS

| | | | |
|---|---|---|---|
| 7,460,722 B2 | 12/2008 | Henry | 382/239 |
| 7,463,782 B2 | 12/2008 | Fuchs et al. | 382/248 |
| 7,477,790 B2 | 1/2009 | Henry | 382/233 |
| 7,567,716 B2 | 7/2009 | Henry et al. | 382/232 |
| 2005/0036649 A1* | 2/2005 | Yokono et al. | 382/100 |
| 2005/0053299 A1 | 3/2005 | Fuchs et al. | 382/239 |
| 2005/0100224 A1 | 5/2005 | Henry et al. | 382/232 |
| 2006/0045326 A1* | 3/2006 | Toyoda et al. | 382/145 |
| 2006/0050789 A1 | 3/2006 | Gisquet et al. | 375/240.23 |
| 2008/0130736 A1 | 6/2008 | Onno et al. | 375/240.01 |
| 2008/0172434 A1 | 7/2008 | Henry | 708/308 |
| 2008/0226185 A1 | 9/2008 | Henry | 382/240 |

FOREIGN PATENT DOCUMENTS

| | | |
|---|---|---|
| FR | 2 906 093 | 3/2008 |
| FR | 2 914 467 | 10/2008 |
| WO | 2008/035223 A2 | 3/2008 |

OTHER PUBLICATIONS

Zhang, L., et al., "Multiscale LMMSE-Based Image Denoising With Optimal Wavelet Selection", IEEE Transactions on Circuits and Systems for Video Technology, vol. 15, No. 4, pp. 469-481, Apr. 1, 2005, pp. 469-481.

Chrysafis, C., et al., "Efficient Context-Based Entropy coding for Lossy Wavelet Image Compression", Data Compression Conference, Mar. 25, 1997, pp. 241-250.

Howard, P.G., et al., "Fast and Efficient Lossless Image Compression", Proceedings of the IEEE Data Compression Conference, Snowbird, Utah, Mar. 30 to Apr. 1, 1993, pp. 351-360.

Liu, Y., et al. "Low Bit-Rate Image Coding Based on Pyramidal Directional Filter Banks", Acoustics, Speech and Signal Processing 2006, ICASSP 2006 Proceedings, 2006 IEEE International Conference in Toulouse, France, May 14-19, 2006, pp. II-437-II-440.

* cited by examiner

METHODS AND DEVICES FOR FILTERING AND CODING A DIGITAL SIGNAL

FIELD

The present invention relates to methods and devices for filtering and coding a digital signal.

It belongs to the general field of the coding and decoding of digital signals representing physical quantities. By way of in no way limiting examples, the signals concerned may represent fixed images or videos or more generally multimedia data.

BACKGROUND

For example, a digital image coming from a digital photographic apparatus consists of a set of N×M elementary image units or pixels, where N is the height of the image and M its width. This image is coded before being stored in memory. The initial data, that is to say the information representing the pixels of the image, are organized in a bi-dimensional table accessible for example line by line.

A digital image generally undergoes a transformation prior to its coding. Likewise, when a coded digital image is decoded, the image undergoes a reverse transformation. The transformation may consist of applying a filter to all or part of the digital image.

A filter may be seen as a convolution product between the image signal and a predetermined vector making it possible, for each pixel of the region to which it is applied, to modify its value according to values of the adjoining pixels, to which coefficients are allocated.

The coding technique described in the patent document FR-A-2 889 382 makes it possible to filter the signal prior to a compression, by orienting the filter along certain directions, for each pixel, with a view to reducing the dynamic range of the signal generated and thus to increase the compression of the signal.

SUMMARY

The main aspects of this filtering, which is used by the present invention in a particular embodiment, are stated below. It is however not impossible for the invention to use another type of transformation, instead of such a filtering.

This filtering, which uses a decomposition of the signal into frequency sub-bands, aims to reduce the quantity of information present in the sub-bands, so as to improve the compression of the signal with a view to storage or transmission thereof.

Each filtered sample has an amplitude value and a geometric orientation value. "Orientation" means here a direction in the image (for example row of pixels or column of pixels or diagonal of pixels).

A filtering is applied according to the orientation that will have been determined as the most appropriate, so as to increase the performance of the filtering.

Such a filtering method makes it possible to take account of local variations and in particular the local orientation of the flow of the digital signal whilst preserving the property of separability of the filtering, that is to say the filtering can be applied independently to the various dimensions of the digital signal processed, for example successively on each of its dimensions, such as, in the case of an image signal, along the rows and along the columns or vice versa.

To facilitate the reverse filtering operation performed on decoding, it is possible to associate, during the coding, with each filtered sample, an item of information representing the geometric orientation of the filter applied to this sample.

The filtering of samples can use a filtering scheme that is particularly advantageous for the present invention, called a lifting scheme, with for example at least two filters, which may each be applied to different samples, which is economical in terms of memory space, given that the samples are replaced during their filtering.

The lifting scheme is a particular implementation of wavelet transformation that performs two successive filterings, a first high-pass filtering and a second low-pass filtering, each sample being replaced by the result of its filtering.

For example, the lifting scheme performs a first passage by selecting the samples having an even position, with a view to their filtering according to a high-pass filter and their replacement. Next, the lifting scheme performs a second passage, selecting the samples having an odd position, with a view to their filtering according to a low-pass filter and their replacement. The high-pass coefficients are generated using solely coefficients of even rank, and then the low-pass coefficients are generated using solely coefficients of odd rank and coefficients generated during the high-pass filtering step.

As for the decoding of a digital signal coded by such a technique, it consists principally of obtaining a plurality of filtered samples and then applying a reverse filtering to filtered samples, this reverse filtering being performed on a filtered sample according to the geometric orientation of the filter that was used for the filtering of this sample during its coding according to the invention.

According to a first aspect, the invention relates to a method and device for filtering a digital signal.

The article by Paul G. Howard and Jeffrey Scott Vitter entitled "*Fast and Efficient Lossless Image Compression*", published in Proceedings of the IEEE Computer Society/NASA/CESDIS Data Compression Conference, Snowbird, Utah, 30 Mar. to 1 Apr. 1993, pages 351 to 360, describes a lossless image compression technique that consists in particular of determining a so-called context value of a sample of the image signal according to the previous samples and to determine a parameter of an entropic coder, the Rice-Golomb coder, by minimizing the rate of all the previous samples that belong to the same context.

The aim of the present invention, according to its first aspect, is to improve the compression ratio of the digital signal without modifying a parameter of an entropic coder, but using the context parameter of each sample of the signal in order to determine the orientation of the filters.

For this purpose, according to its first aspect, the present invention proposes a method of filtering a digital signal in which, for each sample of the signal, a plurality of context functions take account of a predetermined number of other samples of the signal, this method being remarkable in that it comprises steps consisting of:

calculating the value of a context function from the plurality of context functions for each sample to be filtered;

dividing the signal into a set of sub-signals corresponding respectively to the various values of the context functions;

and, for each sub-signal:

determining an optimal filter according to a first criterion that depends on the values of the sub-signal; and associating the optimal filter with the context function corresponding to this sub-signal.

Thus the invention makes it possible to increase the compression performance by improving the quality of the filtering.

In a particular embodiment, the method also comprises a step consisting of selecting, from the plurality of context functions, an optimal context function according to a second predetermined criterion.

This facilitates the compression of the signal.

According to a particular characteristic, the aforementioned predetermined number of other samples is close to a sample having a position corresponding to the position of the sample to be filtered, in a frequency sub-band with resolution immediately lower than the resolution of the sub-band to which the sample to be filtered belongs.

This makes it possible to obtain data representing the statistic in the spatial vicinity of the sample to be coded, which is the most effective with a view to increasing the compression performance.

According to a particular characteristic, the context function can take three values 0, 1 and 2.

This represents a good compromise between the efficacy of the context function and the calculation complexity.

In a particular embodiment, the method uses the following context functions:

$f_1(X)=0$ if $A<B-T$, 1 if $|A-B|\leq T$, 2 if $B<A-T$;
$f_2(X)=0$ if $A<C-T$, 1 if $|A-C|\leq T$, 2 if $C<A-T$;
$f_3(X)=0$ if $A<D-T$, 1 if $|A-D|\leq T$, 2 if $D<A-T$;
$f_4(X)=0$ if $B<C-T$, 1 if $|B-C"\leq T$, 2 if $C<B-T$;
$f_5(X)=0$ if $B<D-T$, 1 if $|B-D|\leq T$, 2 if $D<B-T$;
$f_6(X)=0$ if $C<D-T$, 1 if $|C-D|\leq T$, 2 if $D<C-T$;

where:

X is the value of the sample being filtered,

A, B, C, D are the values of samples adjoining a sample having a position corresponding to the position of the sample X and belonging to the frequency sub-band of resolution immediately lower than the resolution of the sub-band to which the sample X belongs, and T is a predefined threshold value.

From an experimental point of view, these context functions prove to be particularly advantageous.

In a particular embodiment where the filtering is performed according to a plurality of geometric orientations, for each sub-signal, the determination of the optimal filter consists of selecting an orientation from the plurality of orientations.

These oriented filters have good psycho-visual properties in the case where the signal in question is an image signal, namely they minimize the visual impact of the degradations due to the compression of the signal.

According to a particular characteristic, the aforementioned first criterion consists of selecting the orientation that minimizes the sum of the amplitudes of the output samples of the filters according to the various orientations applied to the sub-signal.

According to another particular characteristic, the aforementioned second criterion consists of selecting the context function that minimizes the coding cost of all the sub-signals.

This way of selecting the orientation and the context function makes it possible to optimize the compromise between the distortion caused by the compression and the rate used for coding the signal.

The digital signal in question may represent a fixed image.

The digital signal in question may also represent a video.

For the same purpose as that indicated above, according to its first aspect, the present invention also proposes a device for filtering a digital signal in which, for each sample of the signal, a plurality of context functions take account of a predetermined number of other samples of the signal, this device being remarkable in that it comprises:

a module for calculating the value of a context function from the plurality of context functions for each sample to be filtered;

a module for dividing the signal into a set of sub-signals corresponding respectively to the various values of the context functions;

a module for determining, for each sub-signal, an optimal filter according to a first criterion that depends on the values of the sub-signal; and a module for associating, for each sub-signal, the optimal filter with the context function corresponding to this sub-signal.

Still for the same purpose, the present invention also relates to a telecommunications system comprising a plurality of terminal devices connected through a telecommunication network, remarkable in that it comprises at least one terminal device equipped with a filtering device as succinctly described above.

Still for the same purpose, the present invention also relates to an information storage means that can be read by a computer or a microprocessor storing instructions of a computer program, remarkable in that it allows the implementation of a filtering method as succinctly described above.

Still for the same purpose, the present invention also relates to a computer program product able to be loaded into a programmable apparatus, remarkable in that it comprises sequences of instructions for implementing a filtering method as succinctly described above, when this program is loaded into and executed by the programmable apparatus.

The particular characteristics and the advantages of the filtering device, of the telecommunication system, of the information storage means and of the computer program product being similar to those of the filtering method, they are not repeated here.

According to a second aspect, the present invention relates to a method and device for coding information representing the geometric orientation of a filter used for filtering a digital signal.

The article by Christos Chrysafis and Antonio Ortega entitled "*Efficient Context-Based Entropy Coding for Lossy Wavelet Image Compression*" published in Proceedings of the Data Compression Conf., Snowbird, Utah, March 1997, pages 241 to 250, describes an image compression technique that consists in particular of determining the best context function for each sample of the image signal.

The purpose of the present invention, according to its second aspect, is to improve the compression ratio of the digital signal, by processing the image block by block.

For this purpose, according to its second aspect, the present invention proposes a method of coding information representing the geometric orientation of a filter used for filtering a digital signal representing an image according to a plurality of geometric orientations, in which the orientation of the filter applied to a sample of the signal is determined by the value of a context function for said sample, this method being remarkable in that it comprises steps consisting of:

dividing the image into a plurality of blocks;

for each block in the plurality of blocks, determining an optimal context function according to a first predetermined optimization criterion;

for each block in the plurality of blocks, determining an optimal association table between a context function and orientations according to a second predetermined optimization criterion;

grouping the association tables corresponding to the previously determined optimal context function, so as to obtain a plurality of groups of association tables; and coding each group in the plurality of groups independently of the other groups.

Grouping the association tables corresponding to an optimal context function makes it possible to isolate sets of association tables that correspond to different statistics and thus to increase the compression performance.

According to a particular characteristic, the context function takes account of the values taken by a predetermined number of samples adjoining a sample having a position corresponding to the position of the sample to be filtered in a frequency sub-band of resolution immediately lower than the resolution of the sub-band to which the sample to be filtered belongs.

This makes it possible to obtain data representing the statistic in the spatial vicinity of the sample to be coded, which is the most effective with a view to increasing the compression performance.

According to a particular characteristic, the context function can take three values 0, 1 and 2.

This represents a good compromise between the efficacy of the context function and the calculation complexity.

In a particular embodiment, the method uses the following context functions:

$f_1(X)=0$ if $A<B-T$, 1 if $|A-B|\leq T$, 2 if $B<A-T$;
$f_2(X)=0$ if $A<C-T$, 1 if $|A-C|\leq T$, 2 if $C<A-T$;
$f_3(X)=0$ if $A<D-T$, 1 if $|A-D|\leq T$, 2 if $D<A-T$;
$f_4(X)=0$ if $B<C-T$, 1 if $|B-C"|\leq T$, 2 if $C<B-T$;
$f_5(X)=0$ if $B<D-T$, 1 if $|B-D|\leq T$, 2 if $D<B-T$;
$f_6(X)=0$ if $C<D-T$, 1 if $|C-D|\leq T$, 2 if $D<C-T$;

where:

X is the value of the sample being filtered,

A, B, C, D are the values of samples adjoining a sample having a position corresponding to the position of the sample X and belonging to the frequency sub-band of resolution immediately lower than the resolution of the sub-band to which the sample X belongs, and T is a predefined threshold value.

From an experimental point of view, these context functions prove to be particularly advantageous.

According to a particular characteristic, the first optimization criterion consists of the minimization of the coding cost of the context function.

According to another particular characteristic, the second optimization criterion consists of the minimization of the sum of the amplitudes of the output samples of the filters according to the various orientations applied to the block.

These two criteria make it possible to optimize the compromise between the distortion caused by the compression and the rate used for coding the signal.

The digital signal in question may represent a fixed image.

The digital signal in question may also represent a video.

For the same purpose as that indicated above, according to its second aspect, the present invention also proposes a device for coding information representing the geometric orientation of a filter used for filtering a digital signal representing an image according to a plurality of geometric orientations, in which the orientation of the filter applied to a sample of the signal is determined by the value of a context function for said sample, this device being remarkable in that it comprises:

a module for dividing the image into a plurality of blocks;
a module for determining, for each block in the plurality of blocks, an optimal context function according to a first predetermined optimization criterion;
a module for determining, for each block in the plurality of blocks, an optimal association table between a context function and orientations according to a second predetermined optimization criterion;
a module for grouping the association tables corresponding to the previously determined optimal context function, supplying a plurality of groups of association tables; and
a module for coding each group in the plurality of groups independently of the other groups.

Still for the same purpose, the present invention also relates to a telecommunications system comprising a plurality of terminal devices connected through a telecommunication network, remarkable in that it comprises at least one terminal device equipped with a coding device as succinctly described above.

Still for the same purpose, the present invention also relates to an information storage means that can be read by a computer or a microprocessor storing instructions of a computer program, remarkable in that it allows the implementation of a coding method as succinctly described above.

Still for the same purpose, the present invention also relates to a computer program product able to be loaded into a programmable apparatus, remarkable in that it comprises sequences of instructions for implementing a coding method as succinctly described above, when this program is loaded into and executed by the programmable apparatus.

The particular characteristics and the advantages of the coding device, of the telecommunication system, of the information storage means and of the computer program product being similar to those of the coding method, they are not repeated here.

Other aspects and advantages of the invention will emerge from a reading of the following detailed description of particular embodiments, given by way of non-limiting examples. The description refers to the drawings that accompany it, in which:

DETAILED DESCRIPTION

Figure 1:
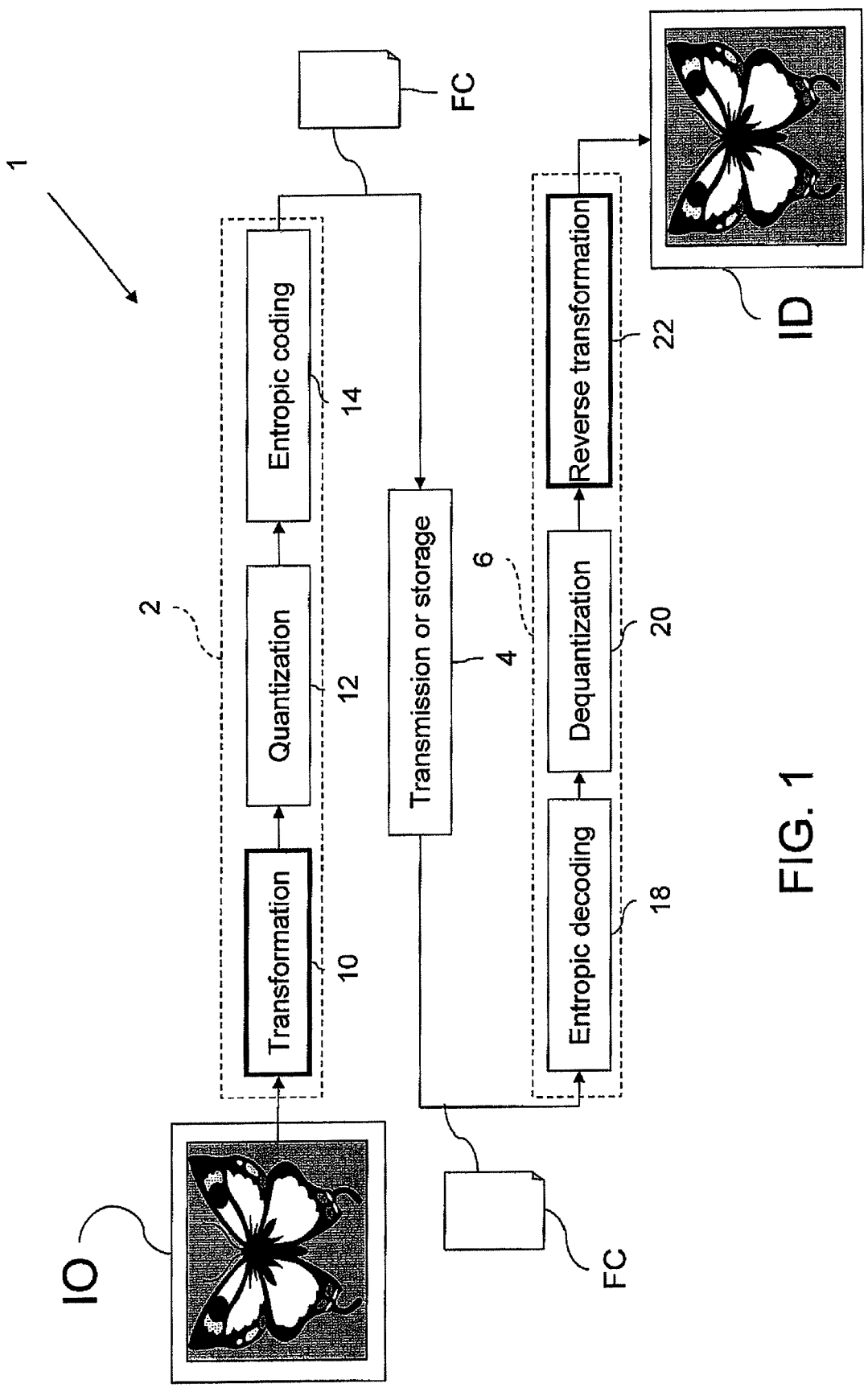
FIG. 1 shows in a simplified fashion a digital image processing system able to implement both a filtering method and a coding method according to the present invention.

The block diagram of FIG. 1 illustrates a system for processing digital images in particular by coding and decoding according to the second aspect of the invention and involving a filtering according to the first aspect of the invention, this system being designated by the general reference denoted 1.

The system comprises a coding device 2, a transmission or storage unit 4 and a decoding device 6.

The invention finds a particularly advantageous application in a telecommunication system comprising a plurality of terminal devices connected through a telecommunication network. The coding method according to the invention can be implemented in terminal devices of the system so as to allow a transmission of files over the telecommunication network and thus to reduce the traffic and transmission times.

Another particularly advantageous application consists of implementing the coding method according to the invention in a multimedia entity storage device, so as to be able to store a large quantity of data in a storage unit.

As shown in FIG. 1 the coding device 2 according to the invention receives as an input an original image 10. The image 10 is processed by the coding device 2, which delivers as an output a coded file containing compressed image data, designated by the reference sign FC.

The processing executed in the coding device 2 consists of performing transformation, quantization and entropic coding operations, respectively in the units 10, 12 and 14.

The transformation operation performed in the unit 10 is the one that implements the invention, while the quantization and entropic coding operations respectively performed in the units 12 and 14 use conventional means.

The coded file FC is supplied to the transmission or storage unit 4 in order for example to be transmitted over a network or stored in a storage unit such as a CD, a DVD or a hard disk.

The decoding device 6 receives as an input the coded file FC coming from the transmission or storage unit 4 and supplies as an output a decoded (or decompressed) image ID, which is substantially identical to the original image 10.

During decoding, the coded image is successively subjected to entropic decoding, dequantization and reverse transformation operations, respectively in the units 18, 20 and 22.

The reverse transformation operation performed in the unit 22 is the one that implements the invention, while the entropic decoding and dequantization steps respectively performed in the units 18 and 20 use conventional means.

Generally, the initial data corresponding to the original image 10 are organized in a bi-dimensional table that is accessible line by line.

The particular embodiment described below presents the coding and decoding of a fixed digital image, that is to say a bi-dimensional signal. The principle is however identical for a signal having a greater number of dimensions, for example, for a video, which is composed of three dimensions.

A description is now given of the coding, in accordance with the method of the invention, of a digital image, this coding comprising in particular a filtering phase consisting of decomposing the digital image signal into frequency sub-bands.

In a particular embodiment of the invention described in detail below, this type of filtering into sub-bands is used for compressing the digital image. Such a filtering can for example be implemented in the JPEG2000 standard, during an operation also referred to as wavelet decomposition.

For more details on the JPEG2000 standard, reference can usefully be made to the following internet address: www.jpeg.org.

However, the present invention differs from the filtering as used in JPEG2000 since the filters used can be oriented, as described in the patent document FR-A-2 889 382.

Figure 3:
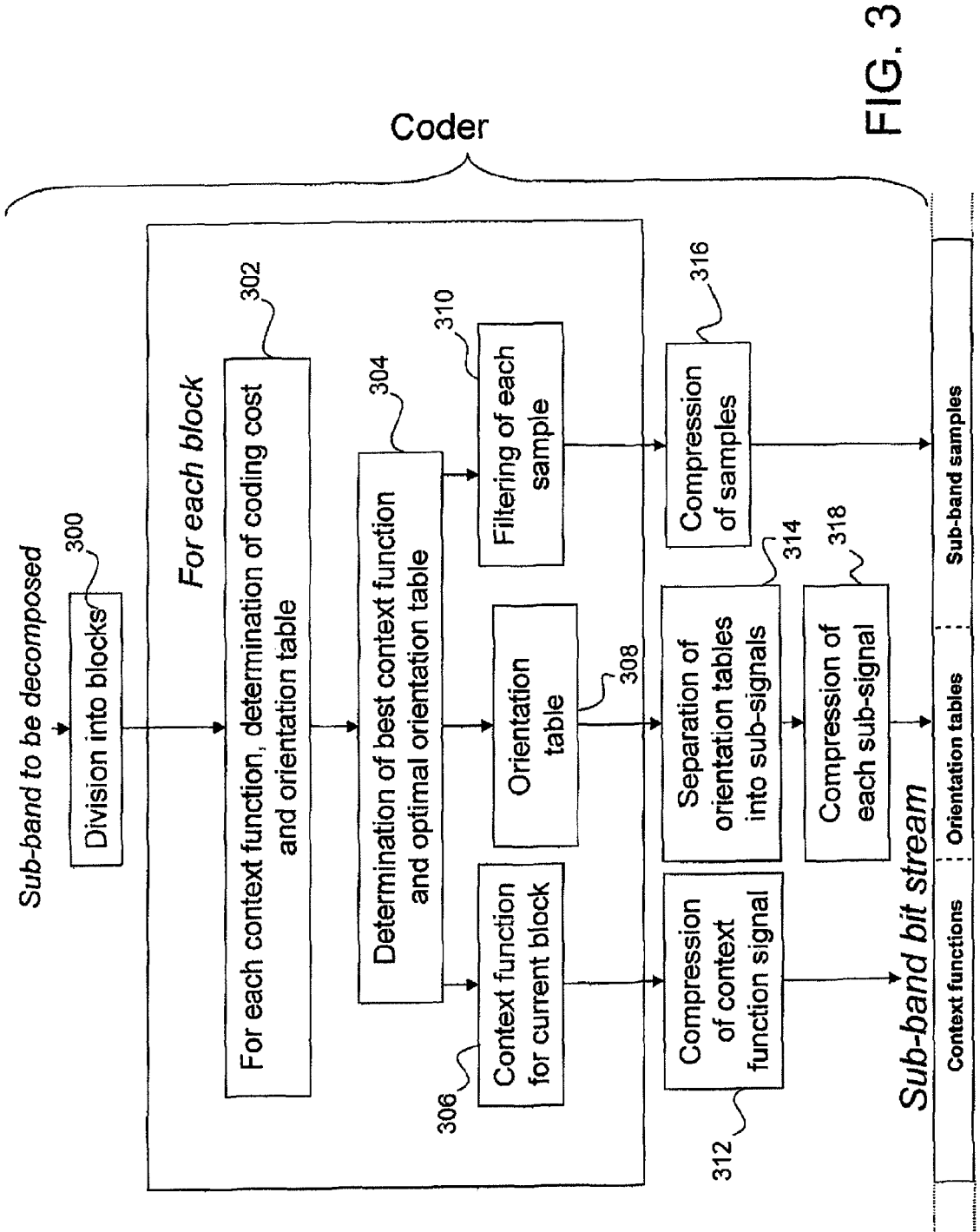
FIG. 3 is a flow diagram illustrating, among the main steps of a filtering method according to the present invention, those that are used during the coding of a digital signal according to the present invention, in a particular embodiment.

The flow diagram in FIG. 3 illustrates steps of a filtering method according to the first aspect of the present invention that are used during the coding of a digital signal according to the second aspect of the present invention, in a particular embodiment where the signal in question is an image signal.

The present invention uses a technique of division into frequency sub-bands similar to wavelet transformation. This technique consists of dividing the original image into several resolutions, each resolution containing three sub-bands, namely the vertical high frequencies, the horizontal high frequencies, and both, except for the lowest resolution level, which contains four sub-bands, namely the aforementioned three sub-bands as well as a low-frequency sub-band.

The performance of the direct filtering, the coding, the decoding and the reverse filtering of a single sub-band is described below. Thus FIG. 3 relates to the coding of a sub-band and FIG. 4 to the decoding of a sub-band.

As shown by FIG. 3, the algorithm begins with step 300, during which a frequency sub-band to be filtered is divided into blocks.

In a variant, the sub-band to be decomposed may be a sub-band obtained during a previous filtering.

It should be noted that the first sub-band to be decomposed is in fact the original image.

The size of the blocks is determined by the input parameters. The sub-band is divided into N square blocks denoted $B_0, B_1, \ldots, B_{N-1}$. A particularly advantageous block size has been determined experimentally as being equal to 16×16 pixels.

Then steps 302 to 310 described below are performed for each of the blocks.

Various concepts necessary for an understanding of these steps are introduced below: oriented filtering, context functions and orientation tables.

As mentioned above, the document FR-A-2 889 382 describes a so-called oriented filtering technique. This is because the high-pass filter used in the first phase of the filtering according to the lifting scheme can be oriented in several predefined directions.

Figure 6:
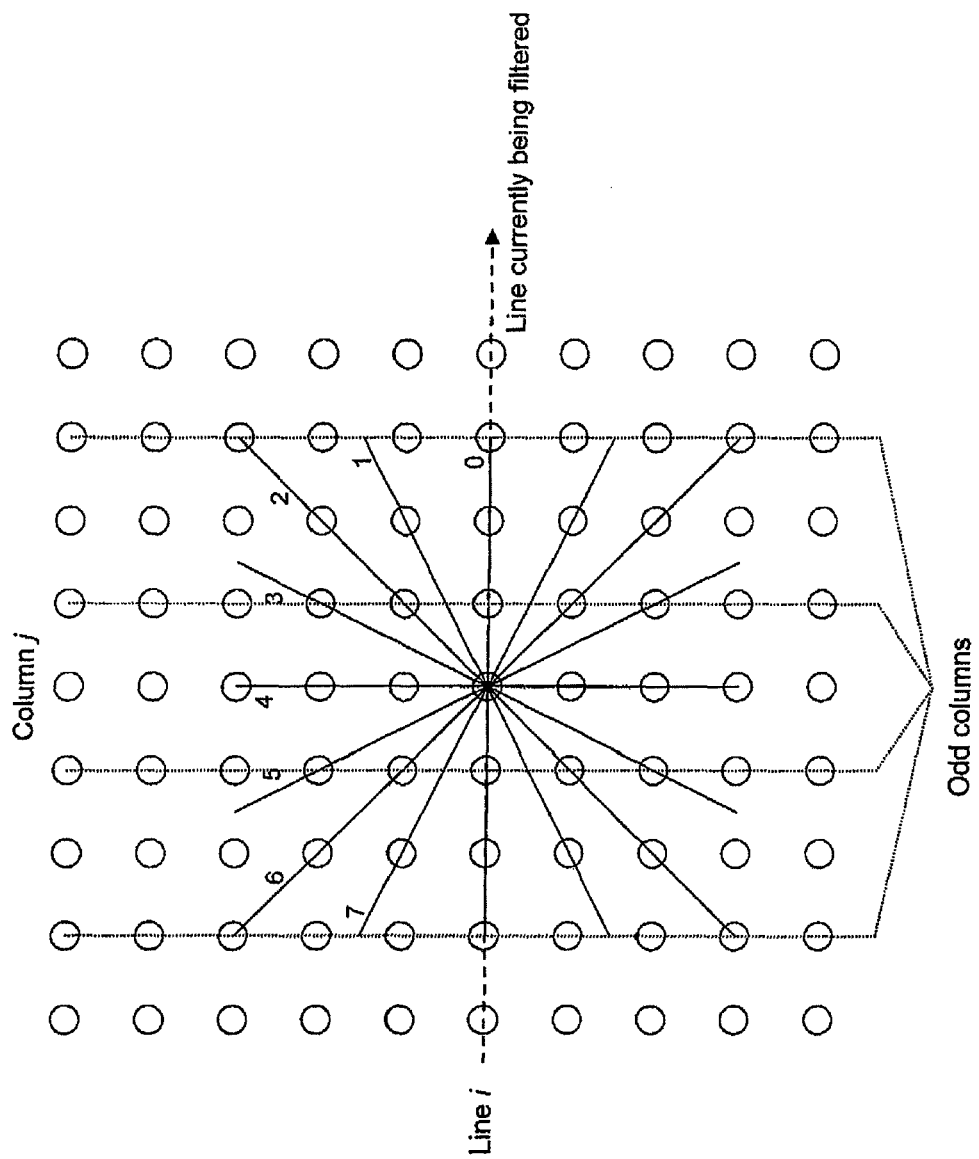
FIG. 6 illustrates an example of filtering according to eight predefined geometric orientations, able to be used both by the filtering method and by the coding method according to the present invention, in a particular embodiment.

It is possible for example to use a 13/7 integer filter with eight predefined orientations, as shown in FIG. 6. This figure illustrates the one-dimensional filtering of the line i, assuming that line number 0 is the bottom line of the image.

The coefficient in the course of high-pass filtering is the $j^{th}$ coefficient of the line, assuming that the column 0 is the furthest to the left in the image. This coefficient is denoted $x(i,j)$.

Figure 7:
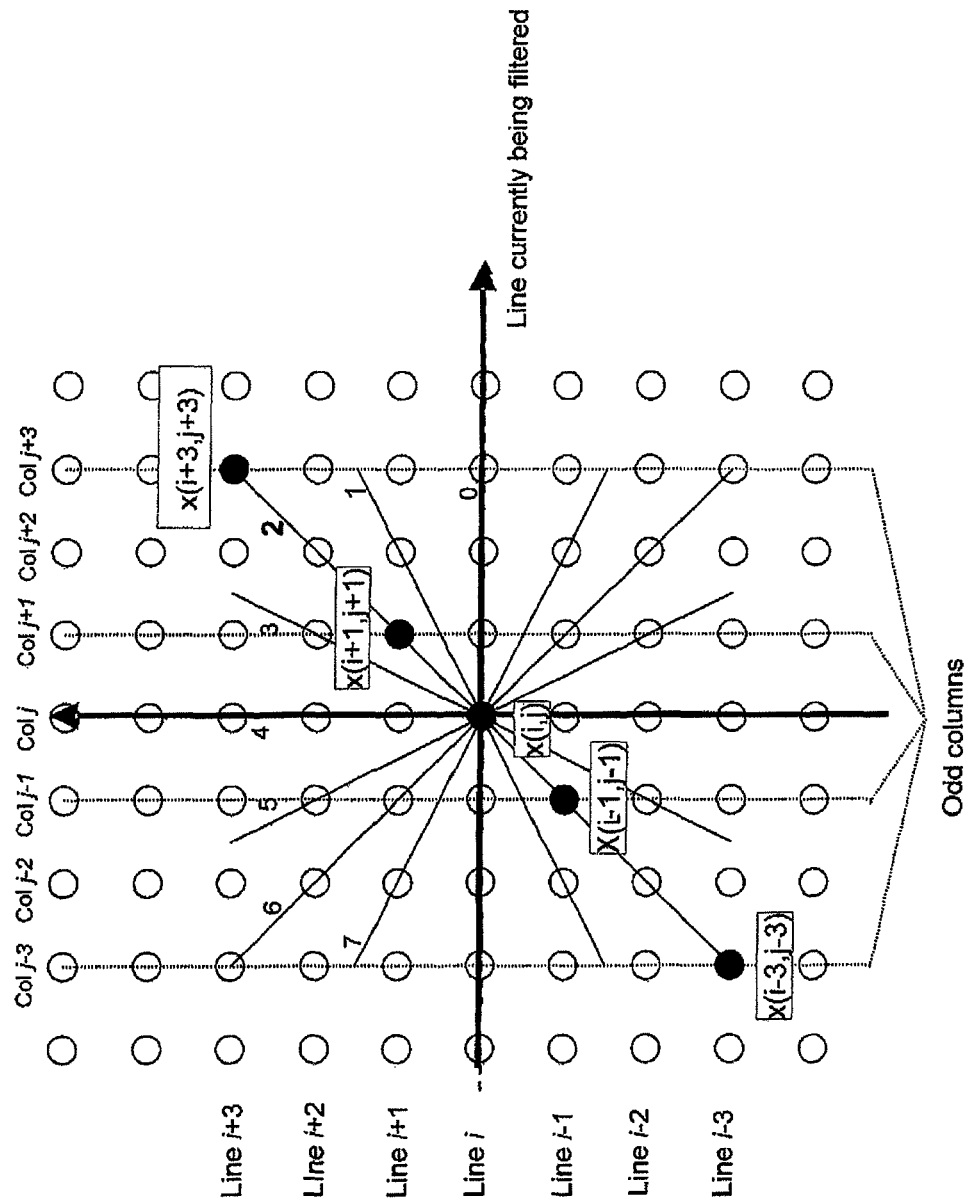
FIG. 7 illustrates an example of filtering according to one of the predefined orientations shown in FIG. 6.

When a conventional wavelet transformation is applied, the filter is applied to the coefficient vector $[x(i,j-3),x(i,j-1), x(i,j),x(i,j+1),x(i,j+3)]$. This is illustrated by the segment numbered 0. Segments 1 to 7 represent the other possible orientations. For example, segment 2 represents the filtering of the vector $[x(i-3,j-3),x(i-1,j-1),x(i,j),x(i+1,j+1),x(i+3,j+3)]$ illustrated by the bold FIG. 2 in FIG. 7.

Figure 8:
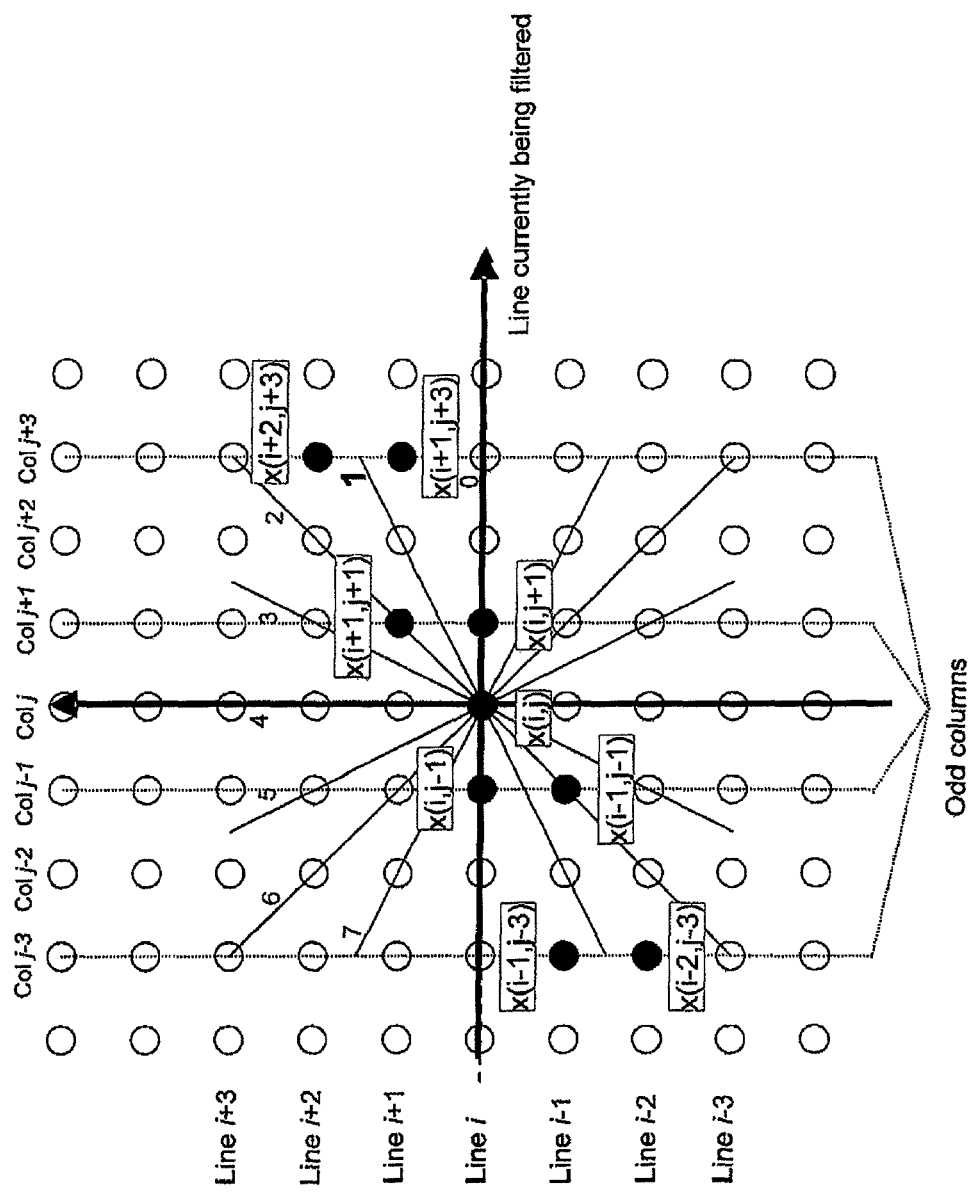
FIG. 8 illustrates an example of filtering according to another of the predefined orientations depicted in FIG. 6.

It may happen that a segment does not directly intercept a coefficient, as is the case with the segment 1 illustrated by the bold FIG. 1 in FIG. 8. In this case, an interpolation between the "accessible" coefficients is used, that is to say, in the present case, the coefficients which belong to an odd column of coefficients. Thus, for example, the segment 1 represents the filtering of the vector: $[(x(i-2,j-3)+x(i-1,j-3))/2,(x(i-1,j-1)+x(i,j-1))/2,x(i,j), (x(i,j+1)+x(i+1,j+1))/2,(x(i+1,j+3)+x(i+2,j+3))/2]$.

Figure 9:
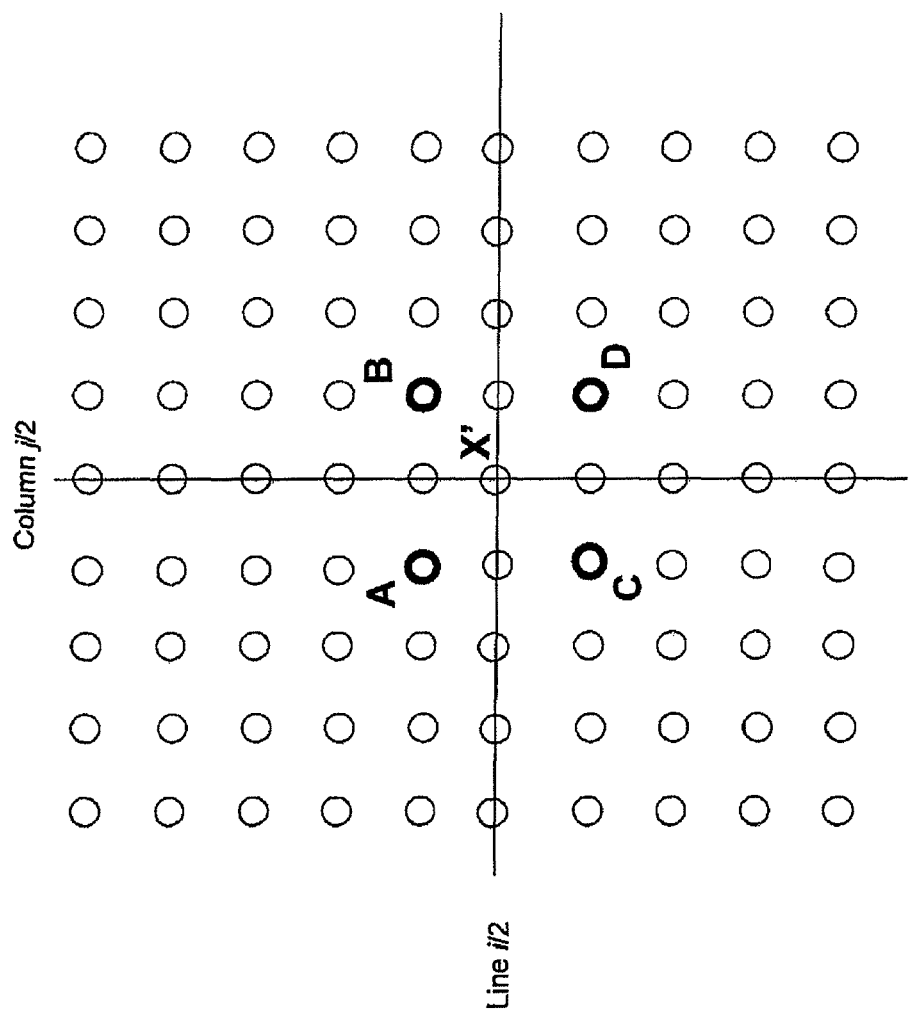
FIG. 9 illustrates samples belonging to the context of a sample in the course of filtering in accordance with the present invention in a particular embodiment.

The concept of context function is now presented in relation to FIG. 9.

In accordance with the present invention, in the preferred embodiment, the orientation of the filter applied to a sample is determined by the value of a context function at the position of the sample. The context function examines the values of the low-frequency sub-band of resolution immediately lower than that of the sub-band currently being filtered, at the positions surrounding the sample of coordinates (i/2, j/2), the coordinates of the sample to be filtered being denoted (i,j). In general terms, the coordinates (i/2, j/2) are taken to be equal to the integer part below the real value of (i/2, j/2).

FIG. 9 shows the position of the so-called context samples around a sample X' situated in the low-frequency sub-band of resolution immediately lower than that of the sub-band currently being filtered and corresponding to the sample to be filtered. These samples are called A, B, C, D. The values of these samples belong to the sub-band of immediately lower resolution. It should be noted that it is not a case of the original values of the samples but of their decoded values, for the purpose of avoiding the propagation of errors. The values of A, B, C, D are thus the same on coding and on decoding. The sample currently being filtered is called X.

In a preferred example embodiment of the present invention, six possible context functions are used. These context functions are as follows:

$f_1(X)=0$ if $A<B-T$, 1 if $|A-B|\leq T$, 2 if $B<A-T$;
$f_2(X)=0$ if $A<C-T$, 1 if $|A-C|\leq T$, 2 if $C<A-T$;
$f_3(X)=0$ if $A<D-T$, 1 if $|A-D|\leq T$, 2 if $D<A-T$;
$f_4(X)=0$ if $B<C-T$, 1 if $|B-C"|\leq T$, 2 if $C<B-T$;
$f_5(X)=0$ if $B<D-T$, 1 if $|B-D|\leq T$, 2 if $D<B-T$;
$f_6(X)=0$ if $C<D-T$, 1 if $|C-D|\leq T$, 2 if $D<C-T$;

where T is a predefined threshold,

Thus each context function can take only three values, 0, 1 and 2. These values are called context values.

The concept of orientation table is now explained. An orientation table is a look-up table (LUT) that associates a filter orientation value with a context value. Knowing that the context functions take only three values (0, 1 and 2), an orientation table is simply a list of three orientations.

The orientation table is used to determine the orientation that must be applied to a sample. For example, the notation [4,0,1] for an orientation table means that a sample X must be filtered with the orientation 4 if the context function of this sample takes the value 0 at the position of X, with the orientation 0 if the context function takes the value 1 at X and with the orientation 1 if the context function takes the value 2 at X.

With reference to FIG. 3, for each block of the sub-band currently being processed, a step 302 consists of calculating a coding cost and an orientation table for each context function.

It is necessary for this purpose to proceed with the determination of the optimal orientation table for a given context function $f_i$.

For this purpose the context value is first of all calculated for each sample in the current block, applying the context function $f_i$ to each pixel of the block and storing the result.

Next the samples corresponding to each of the context values 0, 1 and 2 are separated. This produces three groups of samples, called sub-signals, corresponding respectively to the three context values.

Then, for each of these three groups of samples, the optimal filtering orientation is determined, by simulating the filtering of all the samples in the group in all possible orientations, eight in the non-limiting example illustrated in the drawings, and by selecting the orientation that minimises the sum of the amplitude of the output of the filters on the group in question. The orientation thus selected is considered to be the optimal orientation. It is the orientation that minimises the quantity of energy produced in the block, for the samples of the group in question.

In a variant, to determine the optimal filtering orientation, it would also be possible to minimise the sum of the squares of the output amplitudes of the filters, or to minimise the absolute value of the output amplitudes of these filters.

Next the orientation table that consists simply of the list of optimal orientations calculated during the previous step is constructed, these orientations being ordered according to the increasing values of the context values.

The sum of the amplitude of the output of the filters over a group of samples as defined above represents the coding cost of this group. Consequently the sum of the coding costs of the three groups (which correspond to the context values 0, 1 and 2) of the block represents the coding cost of the context function $f_i$ on the current block.

As explained above, the coding cost of each context function $f_1, f_2, \ldots, f_6$ is therefore calculated and the optimal orientation table and the coding cost associated with each context function are stored.

The following step 304 consists of determining the best context function and the optimal orientation table that corresponds to it.

The best context function is defined as the one that has the lowest coding cost.

Figure 5:
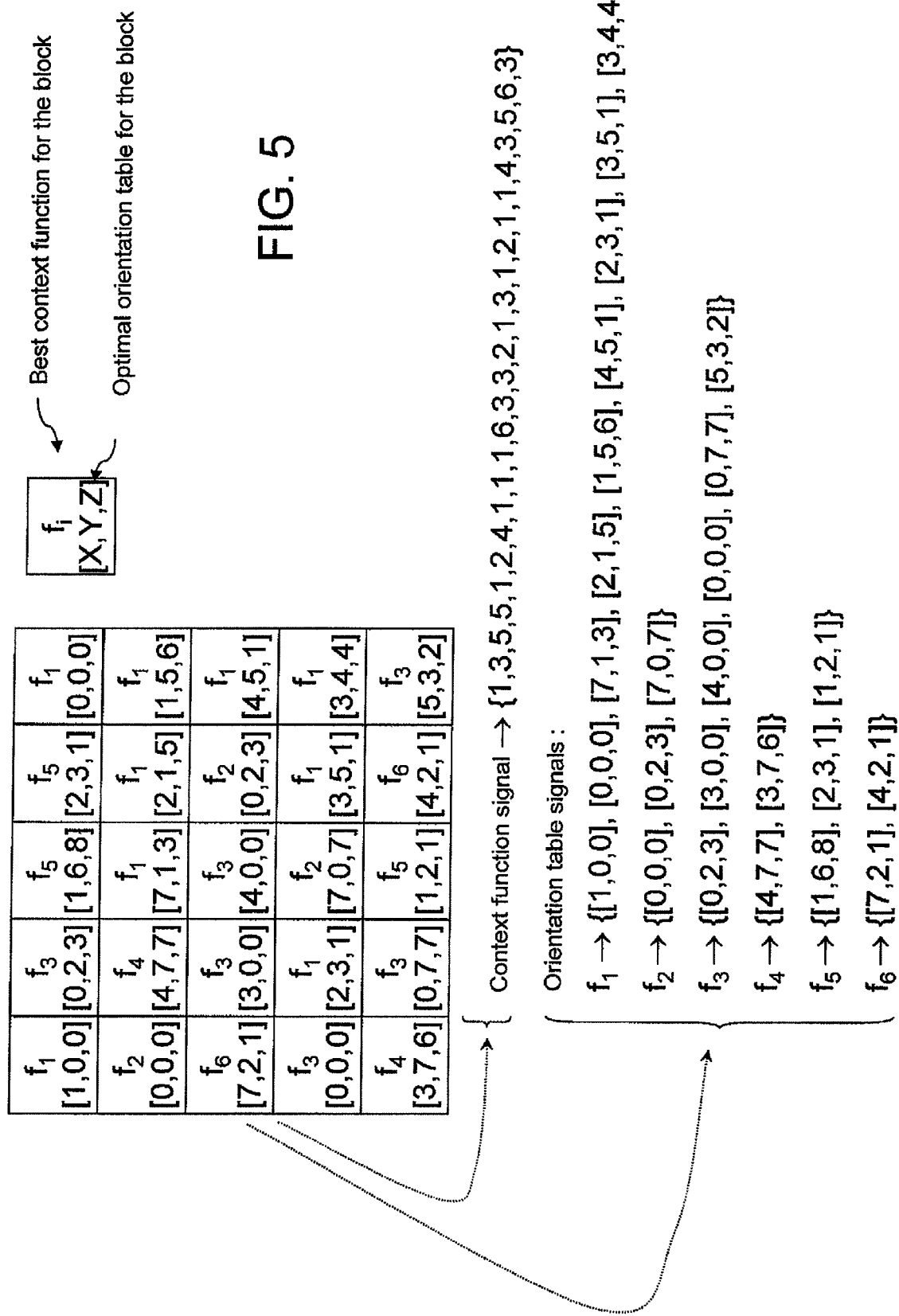
FIG. 5 gives examples of optimal context functions and optimal orientation tables for a sub-band of a digital image signal processed in accordance with the present invention, in a particular embodiment.

This context function and its corresponding optimal orientation table are associated with the current block of the sub-band currently being processed. FIG. 5 illustrates a sub-band of 80×80 samples, divided into 25 blocks of 16×16 pixels. For each block, an optimal context function $f_i$ and an optimal orientation table [X,Y,Z] are calculated. The context functions are then collected together in a single signal that is compressed by conventional means. The orientation tables are grouped together in sub-signals corresponding respectively to the various context functions, and then each sub-signal is compressed independently.

Next, at step 306, the index of the best context function is supplied as an output in the form of a signal that contains all the best context functions, namely one per block.

The following step 312 consists of compressing the signal that contains all the best context functions. For this purpose, it is possible to use a single lossless compression such as a Huffman coding or an arithmetic coding. At this stage, the intrinsic correlations of this signal have not yet been explored.

At step 308, which follows step 304, the optimal orientation table for each block is supplied as an output in the form of a signal containing all the orientation tables.

The following step 314 consists of separating the orientation tables into sub-signals, each sub-signal containing only the orientation tables corresponding to the same context function. FIG. 5 illustrates an example of the construction of these sub-signals.

Thus, by separating the orientation tables corresponding to the various optimal context functions, it is possible to isolate sources that are different from a statistical point of view.

Then a step 318 consists of independently compressing each sub-signal produced at step 314, by means of a conventional lossless compression of the arithmetic coding type for example.

As each sub-signal corresponds to a different statistical source, it is possible to adapt the entropic coder to each statistic and thus to better compress each sub-signal, which results in a global improvement to the compression performance.

Steps 314 and 318 described above constitute an optimized embodiment. In a variant, the orientation tables can simply be coded without being separated into sub-signals, but being grouped together in a single signal, constructed for example by collecting together the orientation tables in the conventional order of the blocks in the image.

Following step 304, a step 310 is also performed consisting of filtering each sample of the current block. For this purpose, the context function and the orientation table of the current block are first of all identified. Then, for each sample of this block, the value of the context function is calculated (in the example given here, this value may be 0, 1 or 2) and the orientation table is used to determine the geometric orientation (in the example given here, a value between 0 and 7) associated with the context value that has just been obtained. This orientation is used to filter the sample.

Following step 310, a step 316 consists of compressing all the filtered samples of the sub-band currently being processed, by normal means, well known to persons skilled in the art, such as scalar quantization and arithmetic coding.

Figure 4:
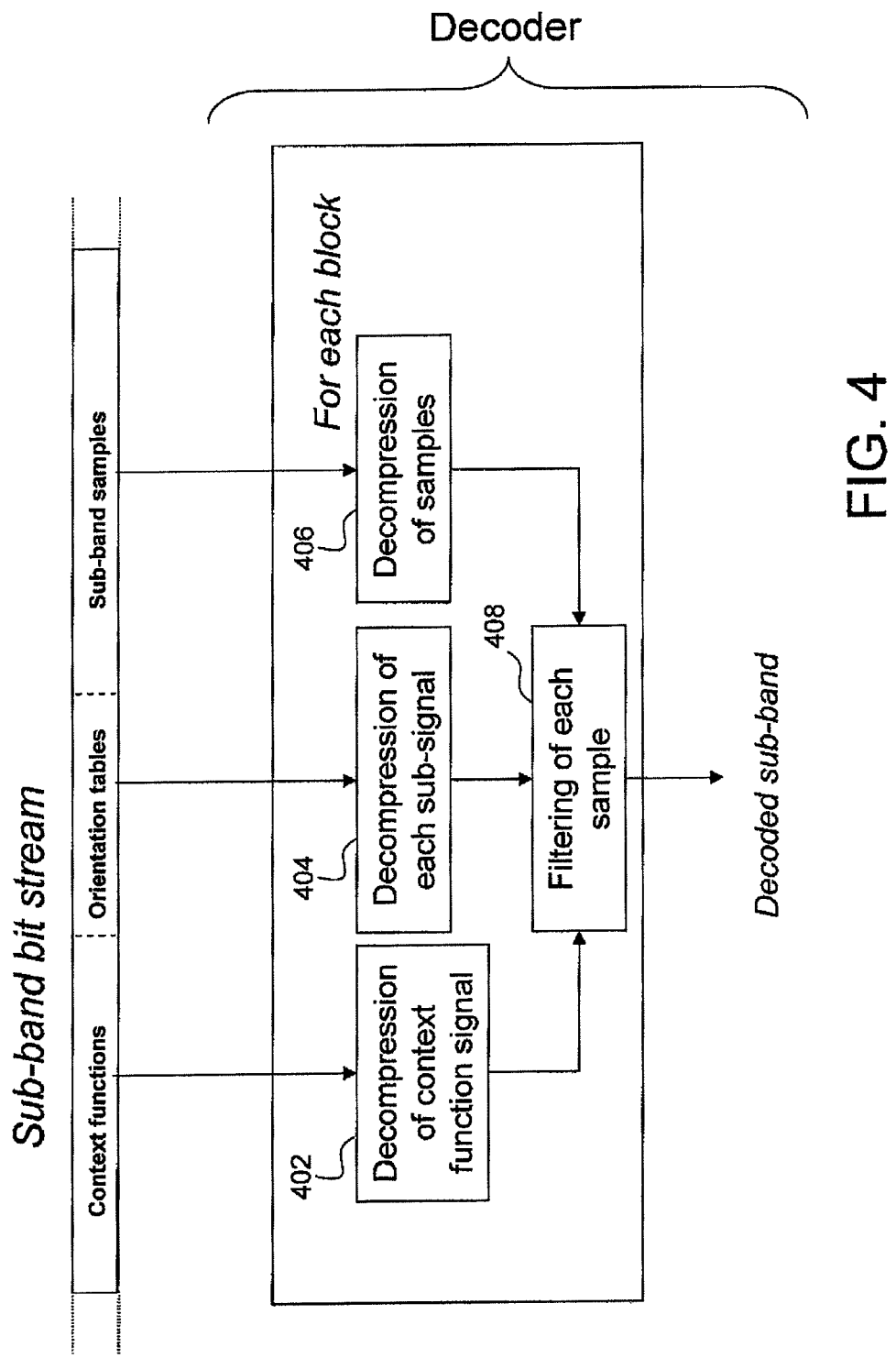
FIG. 4 is a flow diagram illustrating, among the main steps of a filtering method according to the present invention, those that are used during the decoding of a digital signal coded according to the present invention, in a particular embodiment.

The main steps of the decoding of the bit stream constituting a sub-band are now described in relation to the flow diagram in FIG. 4.

A step 402 consists of decompressing the signal containing the context functions, using decoding means symmetrical with the means used during coding. The signal of the context functions thus becomes available and it becomes possible to determine the context function associated with each block.

In addition, during a step 404, the sub-signals containing the orientation tables associated with each context function are decoded independently.

Moreover, during a step 406, all the samples of the sub-band are decoded, for example by an arithmetic decoding and a scalar dequantization, if an arithmetic coding and scalar quantization were used on coding.

It is next necessary, during a step 408, to proceed with the reverse filtering of each sample of the sub-band with the same orientation as that used for the direct filtering. For this purpose, the sub-band is processed block by block and the following processing operations are applied to each block.

First of all, the context function associated with the block is read in the signal of the context functions decoded previously. Once it is identified, it becomes possible to read the orientation signal in the sub-signal corresponding to the context function that has just been read.

Next, for each sample, the orientation of the filter is identified by using the same process as that used on coding: the value of the context function (which, in the example given here, may be 0, 1 or 2) is calculated and the orientation table is used to determine the orientation (a value between 0 and 7, in the example given here) associated with the context value that has just been obtained. This orientation is used to perform the reverse oriented filtering of the sample.

Once these processing operations have been applied to all the samples of the sub-band, a decoded sub-band is obtained.

Figure 2:
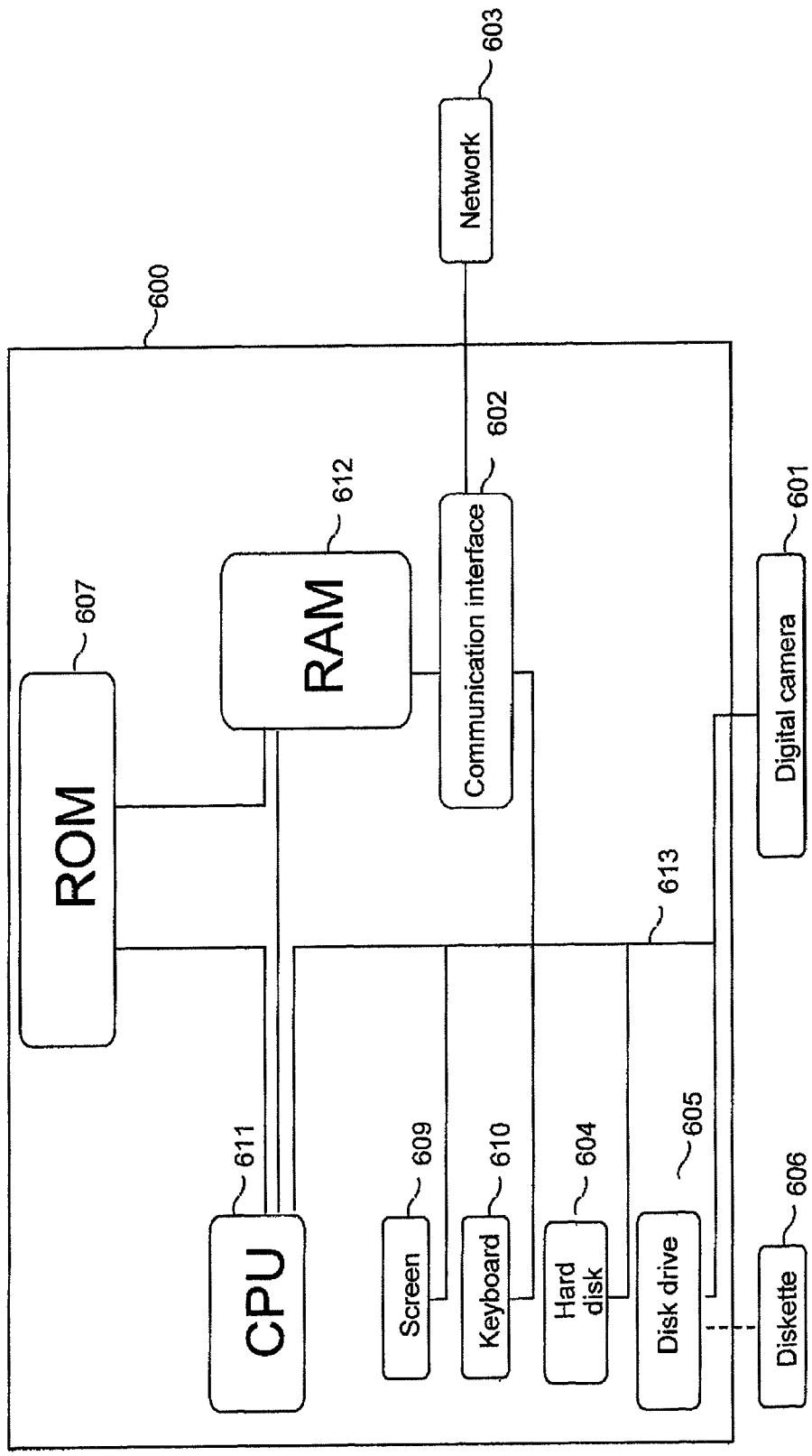
FIG. 2 depicts schematically a particular embodiment of an appliance able to implement the present invention.

FIG. 2 shows a particular embodiment of an information processing device able to function as a device both for filtering and for coding a digital signal according to the present invention.

The device illustrated in FIG. 2 can comprise all or some of the means of implementing a filtering method and all or some of the means of implementing a coding method according to the present invention.

According to the embodiment chosen, this device can for example be a microcomputer or a workstation 600 connected to various peripherals, for example a digital camera 601 (or a scanner, or any other image acquisition or storage means) connected through a graphics card (not shown) and thus supplying information to be processed according to the invention.

The microcomputer 600 preferably comprises a communication interface 602 connected to a network 603 able to transmit digital information. The microcomputer 600 also comprises a permanent storage means 604 such as a hard disk as well as a reader for temporary storage means such as a disk drive 605 for cooperating with a diskette 606.

The diskette 606 and the hard disk 604 can contain software implementation data of the invention as well as the code of the computer program or programs, whose execution by the microcomputer 600 implements the present invention, this code being for example stored on the hard disk 604 once it has been read by the microcomputer 600.

In a variant, the program or programs enabling the device 600 to implement the invention are stored in a read only memory (for example of the ROM type) 607.

According to another variant, this program or programs are received totally or partially over the communication network 603 in order to be stored as indicated.

The microcomputer 600 also comprises a screen 609 for displaying the information to be processed and/or serving as an interface with the user, so that the user can for example parameterize certain processing modes by means of the keyboard 610 or any other suitable pointing and/or entry means such as a mouse, optical pen, etc.

A calculation unit or central processing unit (CPU) 611 executes the instructions relating to the implementation of the invention, these instructions being stored in the read only memory ROM 607 or in the other storage elements described.

When the device 600 is powered up, the processing programs and methods stored in one of the non-volatile memories, for example the ROM 607, are transferred into a random access memory (for example of the RAM type) 612, which then contains the executable code of the invention as well as the variables necessary for implementing the invention.

In a variant, the methods of processing the digital signal can be stored in various storage locations. In general terms, an information storage means that can be read by a computer or by a microprocessor, integrated or not into the device, possibly removable, can store one or more programs whose execution implements the filtering and coding methods described previously.

The particular embodiment chosen for the invention can be developed, for example by adding updated or enhanced processing methods; in such a case, these new methods can be transmitted to the device 600 by the communication network 603, or loaded into the device 600 by means of one or more diskettes 606. Naturally the diskettes 606 can be replaced by any information carrier deemed appropriate (CD-ROM, memory card, etc).

A communication bus 613 allows communication between the various elements of the microcomputer 600 and the elements connected to it. It will be noted that the representation of the bus 613 is not limiting. This is because the central unit CPU 611 is for example able to communicate instructions to any element of the microcomputer 600, directly or by means of another element of the microcomputer 600.

The invention claimed is:

1. A method of coding information representing the geometric orientation of a filter used for filtering a digital signal representing an image according to a plurality of geometric orientations, in which the orientation of the filter applied to a sample of the signal is determined by the value of a context function for said sample, said method comprising:
   dividing the image into a plurality of blocks;
   for each block in said plurality of blocks, determining an optimal context function according to a first predetermined optimization criterion;

for each block in said plurality of blocks, determining an optimal association table between the optimal context function and orientations according to a second predetermined optimization criterion;

grouping the optimal association tables respectively corresponding to each determined optimal context function, so as to obtain a plurality of groups of association tables; and coding each group in said plurality of groups independently of the other groups.

2. A method according to claim 1, wherein the context function takes into account the values taken by a predetermined number of samples in the neighborhood of a sample having a position corresponding to the position of the sample being filtered in a frequency sub-band of resolution immediately lower than the resolution of the sub-band to which the sample being filtered belongs.

3. A method according to claim 2, wherein the context function can take three values 0, 1 and 2.

4. A method according to claim 3, using the following context functions:

$f1(X)=0$ if $A<B-T$, 1 if $|A-B|\leq T$, 2 if $B<A-T$;

$f2(X)=0$ if $A<C-T$, 1 if $|A-C|<T$, 2 if $C<A-T$;

$f3(X)=0$ if $A<D-T$, 1 if $|A-D|\leq T$, 2 if $D<A-T$;

$f4(X)=0$ if $B<C-T$, 1 if $|B-C''|\leq T$, 2 if $C<B-T$;

$f5(X)=0$ if $B<D-T$, 1 if $|B-D|\leq T$, 2 if $D<B-T$;

$f6(X)=0$ if $C<D-T$, 1 if $|C-D|\leq T$, 2 if $D<C-T$;

where

X is the value of the sample being filtered,

A, B, C, D are the values of samples adjoining a sample having a position corresponding to the position of the sample X and belonging to the frequency sub-band of resolution immediately lower than the resolution of the sub-band to which the sample X belongs, and T is a predefined threshold value.

5. A method according to claim 1, wherein said first optimization criterion consists in minimizing the coding cost of the context function.

6. A method according to claim 1, wherein said second optimization criterion consists in minimizing the sum of the amplitudes of the output samples of the filters according to the various orientations applied to the block.

7. A method according to claim 1, wherein the determination of an optimal context function is done among a plurality of context functions.

8. A method according to claim 1, wherein the digital signal represents a still image.

9. A method according to claim 1, wherein the digital signal represents a video.

10. A device for coding information representing the geometric orientation of a filter used for filtering a digital signal representing an image according to a plurality of geometric orientations, in which the orientation of the filter applied to a sample of the signal is determined by the value of a context function for said sample, said device comprising:

means of dividing the image into a plurality of blocks;

means for determining, for each block in said plurality of blocks, an optimal context function according to a first predetermined optimization criterion;

means for determining, for each block in said plurality of blocks, an optimal association table between the optimal context function and orientations according to a second predetermined optimization criterion;

means for grouping the optimal association tables respectively corresponding to each determined optimal context function, so as to obtain a plurality of groups of association tables; and means for coding each group in said plurality of groups independently of the other groups.

11. A non-transitory computer-readable storage medium that can be read by a computer or a microprocessor, storing instructions of a computer program allowing the implementation of a coding method according to claim 1.

12. A computer program product stored on a non-transitory computer-readable storage medium and able to be loaded into a programmable apparatus, containing sequences of instructions for implementing a coding method according to claim 1 when this program is loaded into and executed by said programmable apparatus.

* * * * *